United States Patent
Yamada et al.

(10) Patent No.: US 10,348,747 B2
(45) Date of Patent: Jul. 9, 2019

(54) NON-TRANSITORY COMPUTER-READABLE RECORDING MEDIUM STORING CYBER ATTACK ANALYSIS SUPPORT PROGRAM, CYBER ATTACK ANALYSIS SUPPORT METHOD, AND CYBER ATTACK ANALYSIS SUPPORT DEVICE

(71) Applicant: FUJITSU LIMITED, Kawasaki-shi, Kanagawa (JP)

(72) Inventors: Koji Yamada, Yokohama (JP); Kunihiko Yoshimura, Katsushika (JP); Kouta Tanabe, Zama (JP); Toshitaka Satomi, Yamato (JP); Ryusuke Masuoka, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 72 days.

(21) Appl. No.: 15/628,169

(22) Filed: Jun. 20, 2017

(65) Prior Publication Data

US 2018/0063171 A1    Mar. 1, 2018

(30) Foreign Application Priority Data

Aug. 26, 2016 (JP) ................. 2016-166293

(51) Int. Cl.
```
H04L 29/06      (2006.01)
G06F 17/30      (2006.01)
G06F 16/951     (2019.01)
G06F 21/55      (2013.01)
```

(52) U.S. Cl.
CPC ........ *H04L 63/1416* (2013.01); *G06F 16/951* (2019.01); *G06F 21/552* (2013.01);
(Continued)

(58) Field of Classification Search
CPC ............. H04L 63/1416; H04L 63/1433; G06F 17/3086; G06F 21/552; G06F 21/554
See application file for complete search history.

(56) References Cited

U.S. PATENT DOCUMENTS 10,027,689 B1 *   7/2018  Rathor .............. H04L 63/1416
2007/0226796 A1   9/2007  Gilbert et al.
(Continued)

FOREIGN PATENT DOCUMENTS

| CN | 104901975 A | 9/2015 |
| JP | 2009-037545 | 2/2009 |
| JP | 2011-523748 | 8/2011 |

OTHER PUBLICATIONS

Steven Noel et al "Big Data Architecture for Cyber Attack Graphs"—MITRE case No. 14-3549, published 2014.*
(Continued)

*Primary Examiner* — Noura Zoubair
(74) *Attorney, Agent, or Firm* — Fujitsu Patent Center (57) ABSTRACT

A non-transitory computer readable recording medium storing a computer executable program that, when executed, causes a computer to perform a cyber attack analysis support process, the cyber attack analysis support process includes: when information of a first cyber attack event including information of malware is registered as a result of a detection of the malware within an information processing system to be monitored, searching for a second cyber attack event having a similarity relationship with the first cyber attack event by referring to a storage storing information on past cyber attack events; and displaying information of the searched second cyber attack event and the registered information of the first cyber attack event on a display circuit.

15 Claims, 8 Drawing Sheets

(52) U.S. Cl.
CPC ........ *G06F 21/554* (2013.01); *H04L 63/1433* (2013.01); *H04L 63/0281* (2013.01); *H04L 63/10* (2013.01); *H04L 63/145* (2013.01)

(56) References Cited

U.S. PATENT DOCUMENTS

| | | |
|---|---|---|
| 2009/0300761 A1 | 12/2009 | Park et al. |
| 2015/0205956 A1 | 7/2015 | Sakurai et al. |
| 2015/0244734 A1 | 8/2015 | Olson et al. |
| 2015/0264062 A1 | 9/2015 | Hagiwara et al. |
| 2016/0072833 A1 | 3/2016 | Kim et al. |

OTHER PUBLICATIONS

Singapore Invitation to Respond to Written Opinion, Written Opinion and Search Report dated Feb. 20, 2018 for corresponding Singapore Patent Application No. 10201705331X, 9 pages.

Extended European Search Report dated Nov. 10, 2017 for corresponding European Patent Application No. 17177811.1. 8 pages.

Noel, Steven et al.,"Big-Data Architecture for Cyber Attack Graphs Representing Security Relationships in NoSQL Graph Databases", XP055417525, Retrieved from the Internet: URL:http://csis.gmu.edu/noel/pubs/2015_IEEE_HST.pdf [retrieved on Oct. 19, 2017], 6 pages.

Tsigkas, Orestis et al.,"Visual Spam Campaigns Analysis using Abstract Graphs Representation", Proceedings of the Ninth International Symposium on Visualization for Cyber Security, VIZSEC '12, XP055418376, New York, New York, USA, pp. 64-71, Jan. 1, 2012.

European Office Action dated Feb. 22, 2019 for corresponding European Patent Application No. 17177811.1, 5 pages. *Please note D-1 (XP055417525) cited herewith, was previously cited in an IDS filed on Nov. 30, 2017.*.

* cited by examiner

```xml
<!-- CYBER ATTACK ACTIVITIES -->
<stix:Campaigns>
<stix:Campaign xsi:type="campaign:CampaignType" id="TPA:campaign_example">
<campaign:Title>CYBER ATTACK ACTIVITIES</campaign:Title>
<campaign:Description>DESCRIPTION OF CYBER ATTACK ACTIVITIES</campaign:Description>
<campaign:Short_Description>OUTLINE OF CYBER ATTACK ACTIVITIES</campaign:Short_Description>
<campaign:Names>
<campaign:Name>NAME OF CYBER ATTACK ACTIVITIES</campaign:Name>
</campaign:Names>
<!-- INTENTION OF ATTACK ACTIVITIES -->
<campaign:Intended_Effect>
<stixCommon:Value xsi:type="stixVocabs:IntendedEffectVocab-1.0">Unauthorized Access</stixCommon:Value>
</campaign:Intended_Effect>
<!-- STATE OF ATTACK ACTIVITIES -->
<campaign:Status xsi:type="stixVocabs:CampaignStatusVocab-1.0">Historic</campaign:Status>
<!-- ATTACK METHODS RELATED TO ATTACK ACTIVITIES -->
<campaign:Related_TTPs>
<campaign:Related_TTP>
<stixCommon:TTP idref="TPA:ttp_example"/>
</campaign:Related_TTP>
</campaign:Related_TTPs>
<!-- INCIDENTS RELATED TO ATTACK ACTIVITIES -->
<campaign:Related_Incidents>
<campaign:Related_Incident>
<stixCommon:Incident idref="TPA:incident_example"/>
</campaign:Related_Incident>
</campaign:Related_Incidents>
...
```

NON-TRANSITORY COMPUTER-READABLE RECORDING MEDIUM STORING CYBER ATTACK ANALYSIS SUPPORT PROGRAM, CYBER ATTACK ANALYSIS SUPPORT METHOD, AND CYBER ATTACK ANALYSIS SUPPORT DEVICE

CROSS-REFERENCE TO RELATED APPLICATION

This application is based upon and claims the benefit of priority of the prior Japanese Patent Application No. 2016-166293, filed on Aug. 26, 2016, the entire contents of which are incorporated herein by reference.

FIELD

The embodiments discussed herein are related to a non-transitory computer-readable recording medium storing a cyber attack analysis support program, a cyber attack analysis support method, and a cyber attack analysis support device.

BACKGROUND

In recent years, cyber attacks such as unauthorized accesses via a network have become serious problems. This cyber attacks are performed by various methods. Thus, in order to cope with a cyber attack, it is effective to find out and refer to similar cyber attacks thereto.

As a related technology of obtaining information on cyber attacks similar to each other, there is known a malware similarity inspecting method which compares behavior information obtained from a process result of software executing an unauthorized process and behavior information obtained from software to be inspected with each other so as to inspect the similarity therebetween.

Related technologies are disclosed in, for example, Japanese Patent No. 5083760.

SUMMARY

A non-transitory computer readable recording medium storing a computer executable program that, when executed, causes a computer to perform a cyber attack analysis support process, the cyber attack analysis support process includes: when information of a first cyber attack event including information of malware is registered as a result of a detection of the malware within an information processing system to be monitored, searching for a second cyber attack event having a similarity relationship with the first cyber attack event by referring to a storage storing information on past cyber attack events; and displaying information of the searched second cyber attack event and the registered information of the first cyber attack event on a display circuit.

The object and advantages of the disclosure will be realized and attained by means of the elements and combinations particularly pointed out in the claims. It is to be understood that both the foregoing general description and the following detailed description are exemplary and explanatory and are not restrictive of the disclosure, as claimed.

DESCRIPTION OF EMBODIMENTS

However, the technology of obtaining information on cyber attacks described above in the background section may have a problem in that a user may have a difficulty in recognizing and understanding how the cyber attacks regarding the obtained information are similar with each other.

An aspect of the present disclosure provides a non-transitory computer-readable recording medium storing a cyber attack analysis support program, a cyber attack analysis support method, and a cyber attack analysis support device which may present information on similar cyber attacks to the user in an easy-to-understand manner.

Hereinafter, a cyber attack analysis support program, a cyber attack analysis support method, and a cyber attack analysis support device according to the embodiments will be described with reference to the accompanying drawings. In the embodiments, components having the same or a similar function will be denoted by a common reference numeral, and overlapping descriptions thereof will be omitted. In addition, the cyber attack analysis support program, the cyber attack analysis support method, and the cyber attack analysis support device to be described in the embodiments below are merely exemplary and do not limit the embodiments. In addition, the embodiments may be appropriately combined with each other within a range that does not cause any inconsistency.

Figure 1:
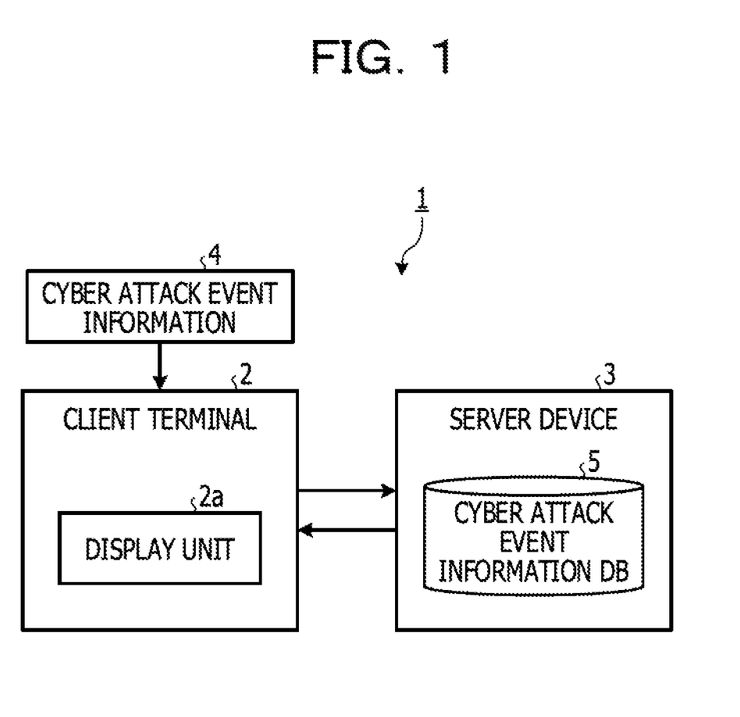
FIG. 1 is a block diagram illustrating an exemplary configuration of an analysis support system according to an embodiment.

FIG. 1 is a block diagram illustrating an exemplary configuration of an analysis support system according to an embodiment. As illustrated in FIG. 1, an analysis support system 1 includes a client terminal 2 and a server device 3. The client terminal 2 and the server device 3 are coupled to be able to communicate with each other via a communication network (not illustrated) such as the Internet or a local area network (LAN).

The client terminal 2 is a terminal device used by a user and may be, for example, a personal computer (PC) or a tablet terminal. The client terminal 2 receives cyber attack event information 4 on a cyber attack event as a result of a detection of malware in an information processing system to be monitored, via an operation by a user or the like. The client terminal 2 transmits the received cyber attack event information 4 to the server device 3.

The server device 3 registers the cyber attack event information 4 received from the client terminal 2 in a cyber attack event information DB 5. Further, the server device 3 searches for cyber attack event information having a specific similarity relationship with the cyber attack event information 4 received from the client terminal 2, in the cyber attack event information DB 5. Subsequently, the server device 3 generates display information that displays both the contents of the cyber attack event information 4 and the contents of the searched cyber attack event information, and outputs the generated display information to the client terminal 2. By displaying the display information output from the server device 3 on a display unit 2a such as a liquid crystal display, the client terminal 2 presents the contents of the cyber attack event information 4 and the contents of the past cyber attack event information similar to the cyber attack event information 4, to a user.

The cyber attack event information 4 indicates cyber attack activities (also referred to as "campaigns") regarding a detected cyber attack event such as a detection of malware in an information processing system to be monitored. The cyber attack event information 4 is described in, for example, the language of the structured threat information expression (STIX) which is a technical specification for describing items related to cyber attack activities by incorporating, for example, events characterizing a cyber attack.

For example, the cyber attack event information 4 includes event contents of respective species of attackers (Threat_Actors), attack methods (TTPs), detection indicators (Indicators), observable events (Observables), incidents (Incidents), countermeasures (Courses_Of_Action), and attack targets (Exploit_Targets), in addition to cyber attack activities (campaigns). Further, the "TTPs" stands for tactics, techniques, and procedures. The contents included together with the cyber attack activities in the cyber attack event information 4 may be information including some of or all the attackers, the attack methods, the detection indicators, the observable events, the incidents, the countermeasures, and the attack targets.

Figure 2:
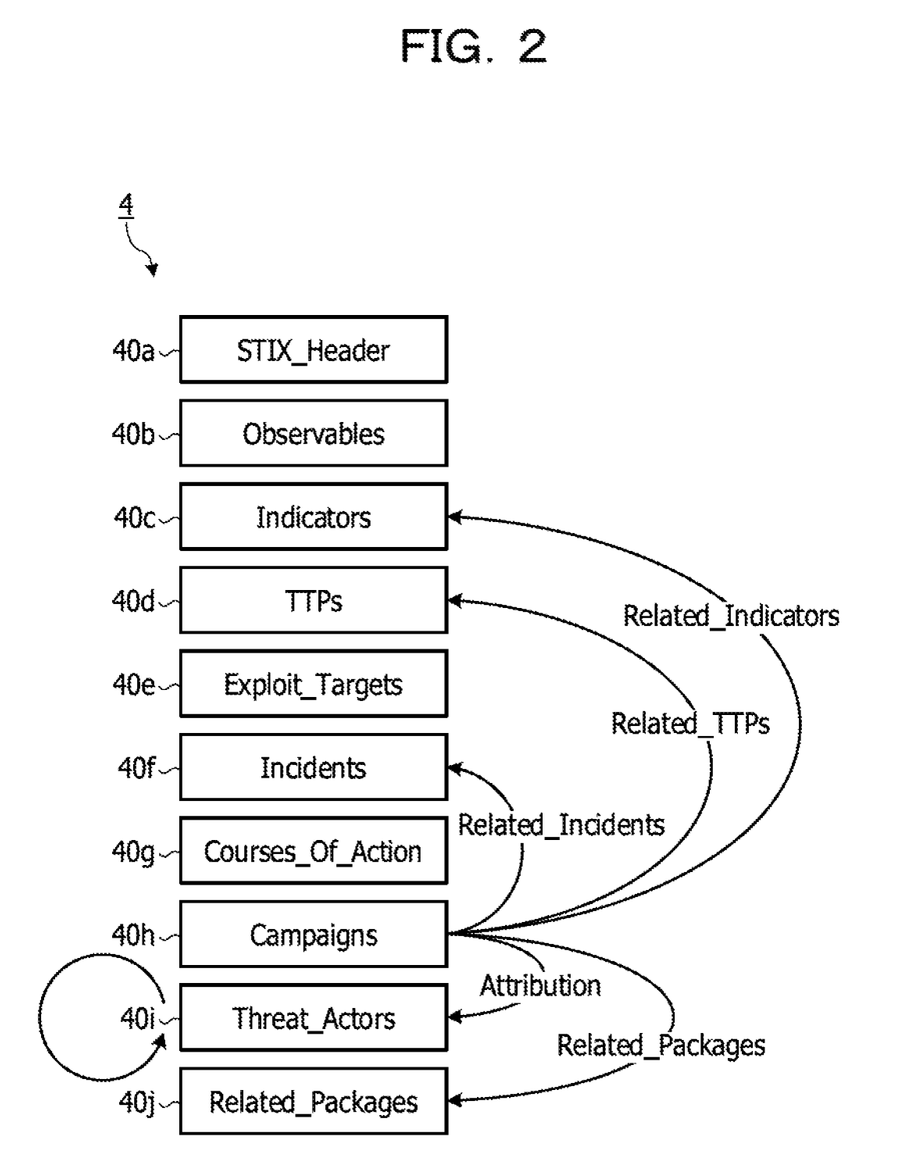
FIG. 2 is an explanatory view for explaining cyber attack event information.

FIG. 2 is an explanatory view for explaining the cyber attack event information 4. As illustrated in FIG. 2, the cyber attack event information 4 has fields 40a and 40j for attached information of STIX_Header and Related_Packages and fields 40b to 40i for information on the respective items related to the cyber attack activities described above. In addition, in the cyber attack event information 4, the fields 40a to 40j are associated with each other by links. For example, the field 40h of the cyber attack activities (campaigns) is linked to the fields of the respective items (e.g., the fields 40c, 40d, 40f, 40i, and 40j).

In the field 40h of the cyber attack activities (campaigns), for example, an intention or a status of corresponding cyber attack activities is described. For example, in the field 40h, each information of an intention of cyber attack activities/attackers (Intended_Effect) is individually described. In addition, in the field 40h, an attack activity status (campaign: Status) is separately described.

In the field 40i of the attackers (Threat_Actors), each information on persons/organizations contributing to the cyber attack is individually described from the viewpoints of, for example, a type, a motive, a skill level, and an intention of attackers of a cyber attack. For example, in the field 40i, an IP address or a mail address of an unauthorized access source (a transmission source) and account information of a social network service of the unauthorized access source may be described individually.

In the field 40d of the attack methods (TTPs), each information on an attack pattern, resources used by attackers such as malware or tools, an attack base of attackers, and an attack target is individually described. Further, the attack pattern (ttp: Attack_Pattern) is described using a common attack pattern enumeration and classification (ACPEC: a common attack pattern list). For example, in the field 40d, information of at least one of an IP address assigned to an information processing device involved in a cyber attack and an access destination from the information processing device is described.

In the field 40c of the detection indicators (Indicators), information indicating indicators characterizing a cyber attack event is individually described. For example, in the field 40c, in addition to the tools used for creating detection indicators from types of detection indicators, each of observable events related to detection indicators, attack step faces, traces and others, indicators characterizing a cyber attack are individually described.

In the field 40b of the observable events (Observables), each information indicating events related to motions observed by a cyber attack event is individually described. For example, in the field 40b, a file name, a hash value, a file size, a registry value, a running service, an HTTP request and others are individually described as events observed by a cyber attack. Further, for the description, CybOX which is a specification for describing observable events of a cyber attack is used.

In the field 40f of the incidents (Incidents), each information of incidents occurring by a cyber attack is individually described from the viewpoints of, for example, classification of incidents as to what kind of an incident is, persons involved in incidents (a reporter, a responder, a mediator, and a victim), assets (an owner, a manager, and a location) damaged by incidents, direct/indirect influence by incidents, and a situation for responding to incidents. For example, in the field 40f, each information of an owner or a manger of assets damaged by attackers of a cyber attack, and the location of the assets is individually described.

In the field 40g of the countermeasures (Courses_Of_Action), each information indicating measures for responding to a threat by a cyber attack event is individually described from the viewpoints of, for example, a situation, a type, a purpose, an influence, costs, and an effectiveness of countermeasures.

In the field 40e of the attack targets (Exploit_Targets), each information indicating weak points of assets as attack targets in a cyber attack event such as software or systems that may become attack targets is individually described from the viewpoints of, for example, weakness, a type of weakness, a setting, and a configuration.

For example, in the field 40e, a common vulnerability and exposures (CVE: a common vulnerability identifier) is used to describe the weakness. In addition, in the field 40e, a common weakness enumeration (CWE: a common weakness type list) is used to describe a type of the weakness. In addition, in the field 40e, a common configuration enumeration (CCE: a common security setting list) is used to describe a security problem in the setting.

Figure 3:
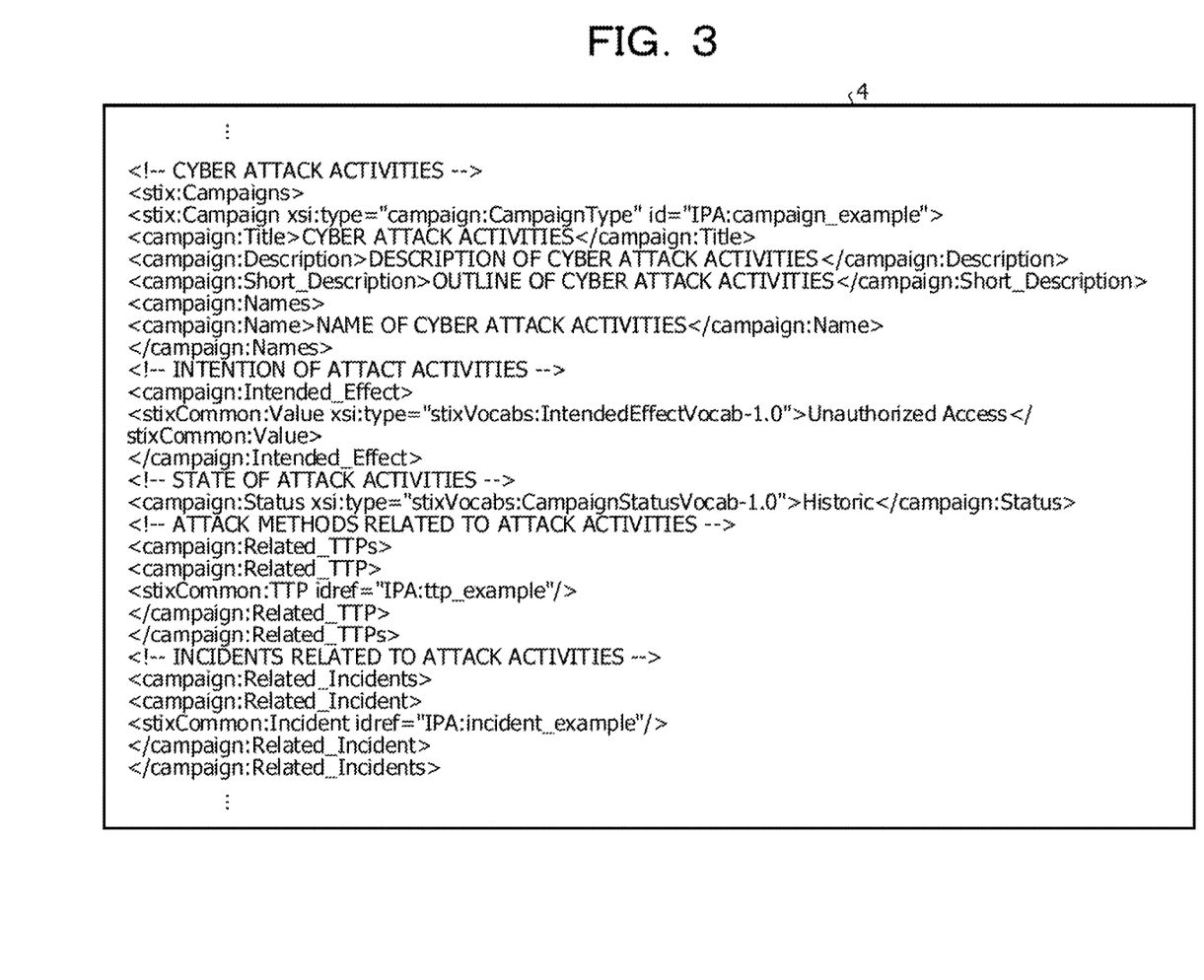
FIG. 3 is a view illustrating an example of the cyber attack event information.

FIG. 3 is a view illustrating an example of the cyber attack event information 4. As illustrated in FIG. 3, the cyber attack event information 4 describes the above-described information in a tree structure where elements attached with tags are hierarchized (box structure) from root elements, by an extensible markup language (XML) format. For example, the cyber attack event information 4 describes a tree structure where cyber attack activities, attackers, attack methods, detection indicators, observable events, incidents, countermeasures, attack targets and others in a cyber attack event are set as elements (nodes), and information within each of the elements is set as child elements (subordinate nodes).

Figure 4:
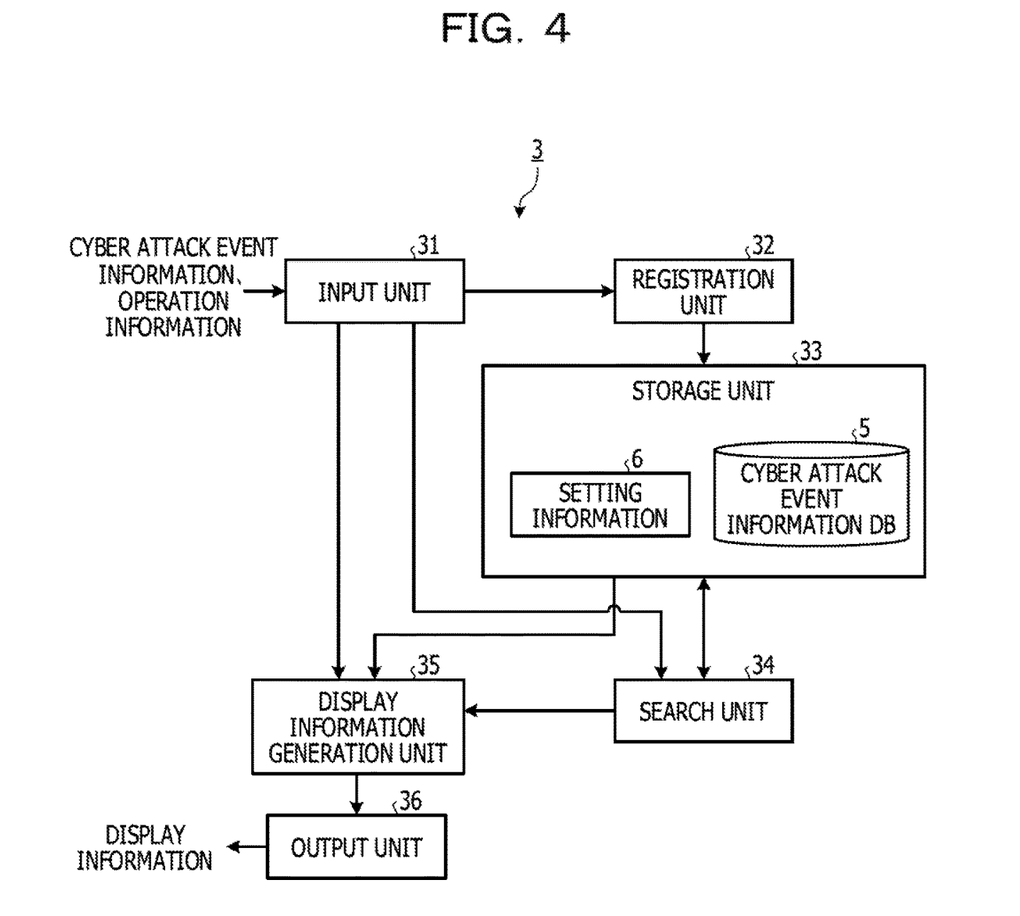
FIG. 4 is a block diagram illustrating an exemplary functional configuration of a server device.

FIG. 4 is a block diagram illustrating an exemplary functional configuration of the server device 3. As illustrated in FIG. 4, the server device 3 includes an input unit 31, a registration unit 32, a storage unit 33, a search unit 34, a display information generator 35, and an output unit 36.

The input unit 31 receives an input of information transmitted from the client terminal 2 via, for example, a communication network. For example, the input unit 31 receives the cyber attack event information 4 or operation information transmitted from the client terminal 2. The operation information indicates an operation instruction received by the client terminal 2 from a user via a user interface. The input unit 31 outputs the cyber attack event information 4 received from the client terminal 2 to the registration unit 32, the search unit 34, and the display information generator 35. Further, the input unit 31 outputs the operation information received from the client terminal 2 to the display information generator 35.

The registration unit 32 registers the cyber attack event information 4 received by the input unit 31 from the client terminal 2 in the cyber attack event information DB 5 of the storage unit 33. The storage unit 33 is a storage device such as a hard disk device 509 (see, e.g., FIG. 8), and stores the cyber attack event information DB 5 and setting information 6.

The cyber attack event information DB 5 is a database DB enabling registration and search of data. For example, the cyber attack event information 4 received from the client terminal 2 is assigned with an identifier ID or the like and registered in the cyber attack event information DB 5, by the registration unit 32.

Figure 6:
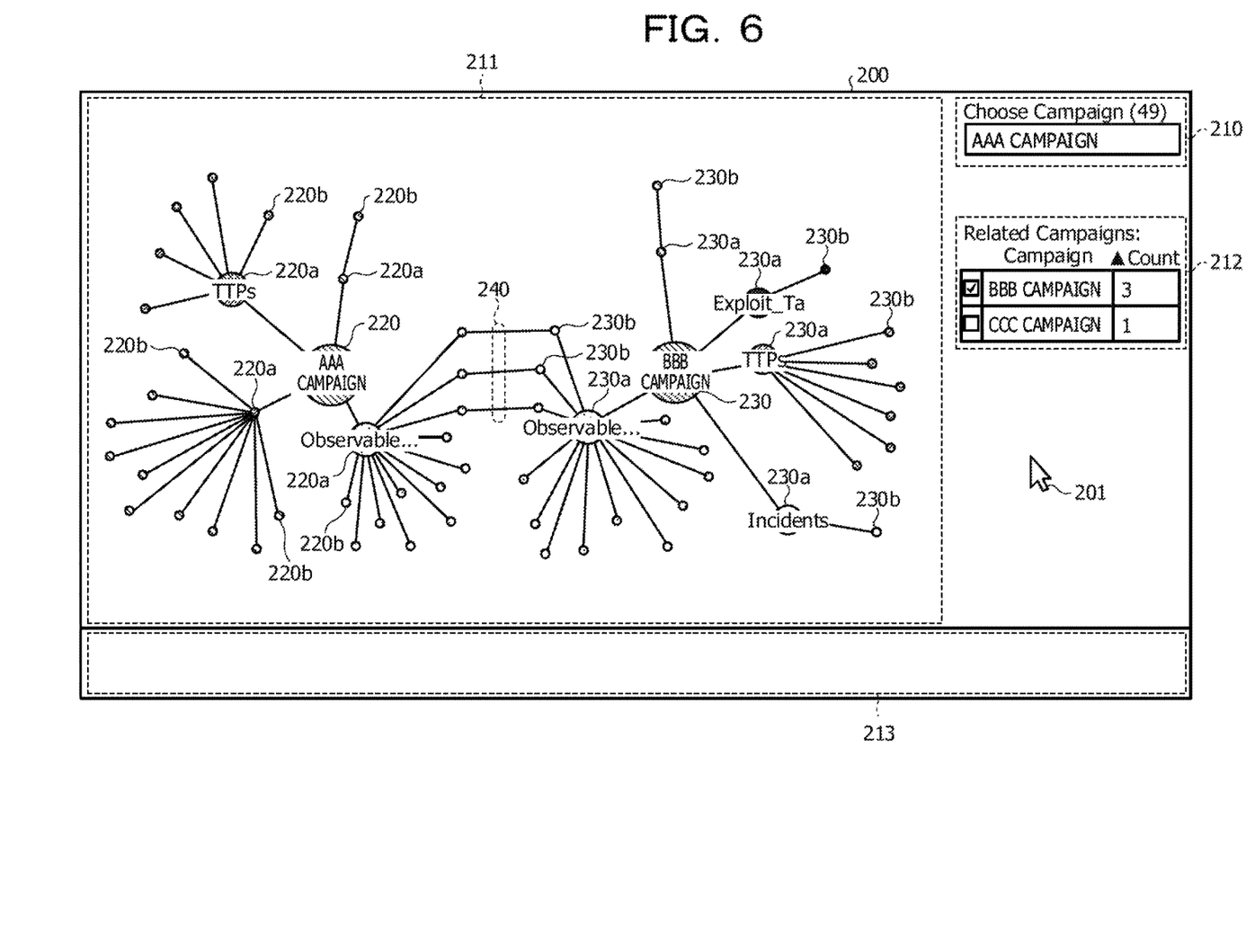
FIG. 6 is an explanatory view for explaining a display screen.

The setting information 6 indicates various setting contents which are input from the client terminal 2 via the input unit 31 so as to be preset. For example, the setting information 6 includes information on display settings such as rules when the display information generator 35 generates display information to be transmitted to the client terminal 2. As an example, the setting information 6 includes display settings such as a size, a color, and a display position of nodes 220, 220a, 220b, 230, 230a, and 230b which are objects to be displayed within a display screen 200.

Based on the cyber attack event information 4 received from the client terminal 2, the search unit 34 searches for cyber attack event information that satisfies a predetermined similarity relationship, from the cyber attack event information registered in the cyber attack event information DB 5, and outputs the search result to the display information generator 35.

For example, the search unit 34 compares the cyber attack event information 4 received from the client terminal 2 with the cyber attack event information registered in the cyber attack event information DB 5. Subsequently, the search unit 34 calculates a degree of similarity between the information by comparing child elements (information within elements) of the respective elements (e.g., cyber attack activities, attackers, attack methods, detection indicators, observable events, incidents, countermeasures, and attack targets) in a cyber attack event between the information. For example, when the number of child elements matching with each other in contents is equal to or greater than a predetermined number, the search unit 34 determines that the information has a high degree of similarity with each other and satisfies the predetermined similarity relationship. Subsequently, the search unit 34 outputs the cyber attack event information searched as satisfying the predetermined similarity relationship from the cyber attack event information DB 5, to the display information generator 35.

The display information generator 35 generates display information that displays both the cyber attack event information 4 registered for the cyber attack event, for example, the cyber attack event information 4 received from the client terminal 2, and the cyber attack event information searched by the search unit 34, for example, the cyber attack event information having the similarity relationship with the cyber attack event information 4. Further, the display information generator 35 generates display information that displays contents of the search result (e.g., a list of cyber attack event information having the similarity relationship or the degree of the similarity), based on the search result by the search unit 34.

For example, the display information generator 35 performs a syntax analysis for the cyber attack event information 4 in the XML format, and acquires the information on the respective species of the attackers, attack methods, detection indicators, observable events, incidents, countermeasures, and attack targets, in addition to the cyber attack activities. Subsequently, in the syntax analysis result, the display information generator 35 analyzes the tree structure where the cyber attack activities, attackers, attack methods, detection indicators, observable events, incidents, countermeasures, and attack targets in the cyber attack event are set as representative nodes, and the information within each of the nodes is set as subordinate nodes. As an example, the display information generator 35 performs the analysis of the tree structure by analyzing the box structure of the elements (nodes) attached with tags. Subsequently, based on the analysis result of the tree structure, the display information generator 35 generates display information that displays the cyber attack event information 4 as a graphic diagram in which the nodes are coupled to each other by coupling lines according to the tree structure.

In addition, the display information generator 35 refers to the cyber attack event information having a similar relationship from the cyber attack event information DB 5 based on the search result of the search unit 34. Subsequently, the display information generator 35 performs a syntax analysis of the cyber attack event information having a similarity relationship and analysis of the tree structure as performed for the cyber attack event information 4. Based on the analysis result, the display information generator 35 generates display information that displays the cyber attack event information having a similar relationship as a graphic diagram in which the nodes are coupled to each other by coupling lines according to the tree structure.

Subsequently, the display information generator 35 determines a relevance of the respective species between the graphic diagram of the cyber attack event information 4 and the graphic diagram of the cyber attack event information having a similar relationship. For example, the display information generator 35 compares the child elements (information within elements) of the respective elements (e.g., the cyber attack activities, attackers, attack methods, detection indicators, observable events, incidents, countermeasures, and attack targets) in the cyber attack event. Based on the comparison result, the display information generator 35 determines the nodes of the child elements matching with each other in contents to be nodes of related species. The display information generator 35 generates display information that associates the nodes of the related species with each other by coupling lines. Accordingly, when performing the display of both the cyber attack event information 4 and the cyber attack event information having a similar relationship with the cyber attack event information 4, a display in which the nodes of the related species are coupled to each other by coupling lines may be performed.

In addition, when generating the display information, the display information generator 35 reads the setting information 6 and determines, for example, a size, color, and display position of each of the nodes in the graphic diagrams according to the preset display settings.

The display information generated by the display information generator 35 is output to the output unit 36. The output unit 36 outputs the display information generated by the display information generator 35 to the client terminal 2.

Figure 5:
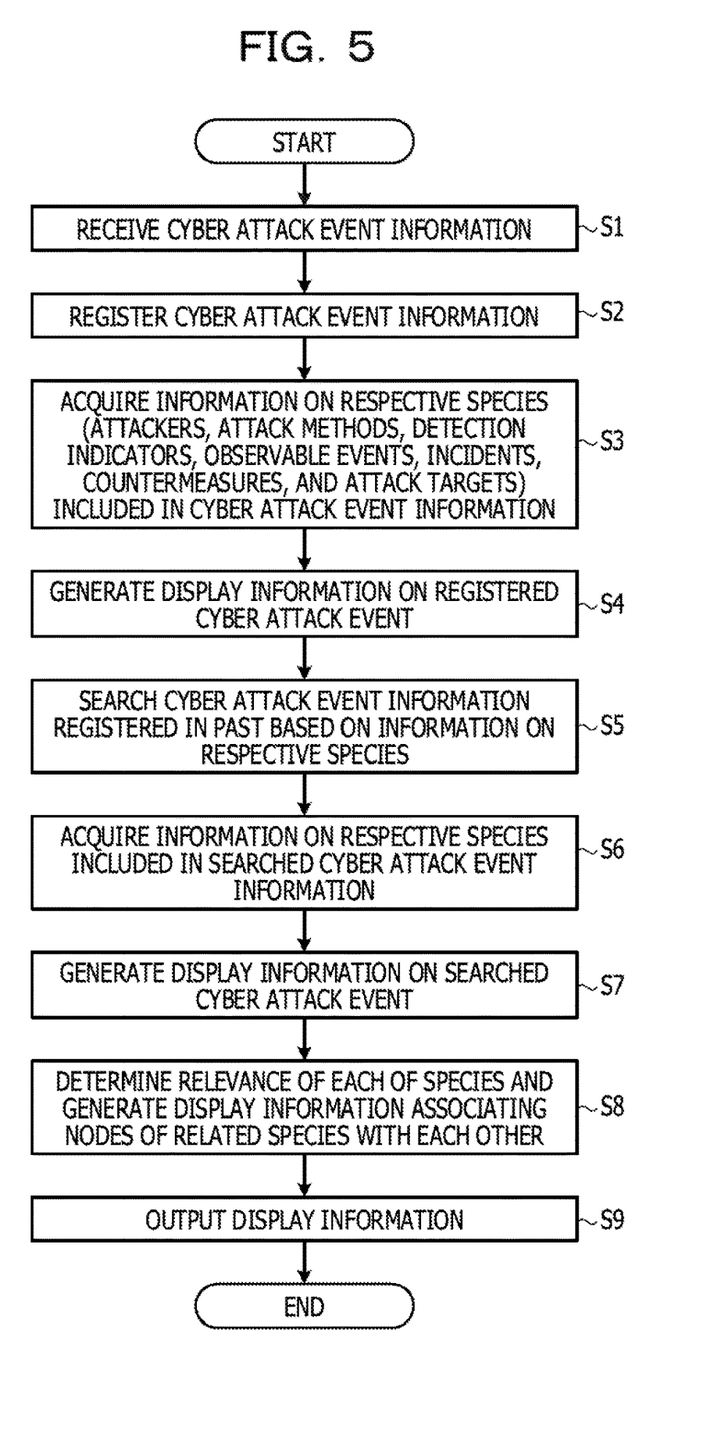
FIG. 5 is a flowchart illustrating an exemplary operation of the server device.

FIG. 5 is a flowchart illustrating an exemplary operation of the server device 3. As illustrated in FIG. 5, when the process is started, the input unit 31 receives the cyber attack event information 4 from the client terminal 2 (S1). Subsequently, the registration unit 32 registers the cyber attack event information 4 received from the client terminal 2 in the cyber attack event information DB 5 (S2).

Subsequently, the display information generator 35 performs a syntax analysis of the cyber attack event information 4 received from the client terminal 2, and acquires the information on the respective species of the attackers, attack methods, detection indicators, observable events, incidents, countermeasures, attack targets and others, in addition to the cyber attack activities (S3).

Subsequently, based on the acquired information, the display information generator 35 analyzes the tree structure where the cyber attack activities, attackers, attack methods, detection indicators, observable events, incidents, countermeasures, attack targets and others are set as representative nodes, and information within each of the nodes is set as subordinate nodes. Subsequently, based on the analysis result of the tree structure, the display information generator 35 generates the graphic diagram in which the nodes are coupled to each other by coupling lines according to the tree structure, for example, the display information indicating the contents of the registered cyber attack event information 4 (S4).

Subsequently, the search unit 34 searches the cyber attack event information DB 5 based on the information on the respective species in the cyber attack event information 4 received from the client terminal 2, and searches for information having a predetermined similarity relationship from the cyber attack event information registered in the past (S5).

Subsequently, the display information generator 35 reads the cyber attack event information searched from the cyber attack event information DB 5 and acquires the information on the respective species of the cyber attack event information having a similarity relationship (S6). Subsequently, the display information generator 35 performs a syntax analysis of the cyber attack event information having a similar relationship and the analysis of the tree structure, and generates the display information on the cyber attack event information having a similarity relationship (S7).

Subsequently, the display information generator 35 determines the relevance of the respective species between the graphic diagram of the cyber attack event information 4 and the graphic diagram of the cyber attack event information having a similarity relationship. Subsequently, based on the result of the relevance determination, the display information generator 35 generates the display information in which the nodes matching with each other in contents are set as nodes of the related species, and the nodes of the related species are associated with each other by coupling lines (S8).

Subsequently, the output unit 36 outputs the display information generated by the display information generator 35 to the client terminal 2 (S9). Accordingly, in the client terminal 2, the display information generated by the server device 3 is displayed on the display unit 2a. For example, the display unit 2a displays both the contents of the cyber attack event information 4 and the contents of the cyber attack event information having a predetermined similarity relationship from the past cyber attack event information.

FIG. 6 is an explanatory view for explaining a display screen. A display screen 200 in FIG. 6 is an example of a screen displayed on the display unit 2a of the client terminal 2 based on the display information output from the server device 3. As illustrated in FIG. 6, the display screen 200 includes a console 201, an event selection region 210, a cyber attack event display region 211, a related event display region 212, and a detailed information display region 213.

The console 201 is, for example, a mouse cursor operated according to the operation information received by the client terminal 2. The event selection region 210 is a region for selecting the cyber attack event information 4. The client terminal 2 notifies the server apparatus 3 of the cyber attack event information 4 selected by the event selection region 210.

The cyber attack event display region 211 is a region for displaying the display information output from the server device 3 with regard to the contents of the cyber attack event information 4. For example, the cyber attack event display region 211 displays both contents of an "AAA campaign" on the cyber attack event information 4 and contents of a "BBB campaign" on the cyber attack event information having a similarity relationship with the cyber attack event information 4. By the display of the cyber attack event display region 211, a user may easily understand the cyber attack information that is similar to each other.

For example, the cyber attack event display region 211 displays a graphic diagram in which the cyber attack activity of the "AAA campaign" is set as the root node 220, and the node 220 is coupled to the nodes 220a representing the attackers, attack methods, detection indicators, observable events, incidents, countermeasures, attack targets and others by coupling lines. In addition, the information within each of the nodes 220a is coupled as the nodes 220b to each of the nodes 220a. Accordingly, the cyber attack event display region 211 displays the tree structure reaching to the nodes 220b from the root node 220.

Likewise, the cyber attack event display region 211 displays a graphic diagram in which the cyclic attack activity of the "BBB campaign" is set as the root node 230, and the root node 230 is coupled to the nodes 230a representing the attackers, attack methods, detection indicators, observable events, incidents, countermeasures, attack targets, and others by coupling lines. In addition, the information within each of the nodes 230a is coupled as the nodes 230b to each of the nodes 230a by coupling lines. Accordingly, the cyber attack event display region 211 displays the tree structure reaching to the nodes 230b from the root node 230.

For example, in the nodes 220a and 230a of the attackers (Threat_Actors), information on persons/organizations contributing to the cyber attack is displayed as the subordinate nodes 220b and 230b, from the viewpoints of, for example, a type, a motive, a skill level, and an intention of an attacker of a cyber attack. For example, any one of an IP address or a mail address and an account information of a social network service of an unauthorized access source (transmission source) is displayed as the nodes 220b and 230b. Accordingly, a user may easily recognize the IP address or the mail address and the account of the social network service of the unauthorized access source (transmission source).

In addition, in the nodes 220a and 230a of the attack methods (TTPs), information on a pattern of attacks, resources such as malware or tools used by attackers, an attack base of attackers, and attack targets is displayed as the subordinate nodes 220b and 230b. For example, at least one of an IP address assigned to an information processing device involved in the cyber attack and an access destination from the information processing device is displayed as the nodes 220b and 230b. Accordingly, a user may easily recognize the IP address assigned to the information processing apparatus involved in the cyber attack and the access destination from the information processing device.

In addition, in the nodes 220a and 230a of the detection indicators (Indicators), information indicating indicators characterizing the cyber attack event is displayed as the subordinate nodes 220b and 230b.

In addition, in the nodes 220a and 230a of the observable events (Observables), information indicating incidents related to motions observed by the cyber attack event is displayed as the subordinate nodes 220b and 230b.

In addition, in the nodes 220a and 230a of the incidents (Incidents), information of incidents occurring by the cyber attack is displayed as the subordinate nodes 220b and 230b.

In addition, in the nodes 220a and 230a of the countermeasures (Courses_Of_Action), information indicating measures for responding to a threat by the cyber attack event is displayed as the subordinate nodes 220b and 230b.

In addition, in the nodes 220a and 230a of the attack targets (Exploit_Targets), information indicating weak points of assets as attack targets in the cyber attack event such as software or systems that may become attack targets is displayed as the subordinate nodes 220b and 230b.

Accordingly, by confirming the tree structure of the cyber attack event display region 211, a user may easily understand the contents of the cyber attack activities of both the "AAA campaign" and the "BBB campaign." For example, the user may easily understand the contents of 5W1H in both the cyber attacks from the relationship between the respective species of the attackers, attack methods, detection indicators, observable events, incidents, countermeasures, and attack targets, and the subordinate information thereof.

In addition, in the graphic diagram of the "AAA campaign" and the graphic diagram of the "BBB campaign," an association display 240 in which the nodes of the related species are coupled to each other by coupling lines is performed. Accordingly, a user may easily compare the related nodes for the "BBB campaign" similar to the "AAA campaign."

The related event display region 212 is a region for displaying the search result of the search unit 34. For example, in the related event display region 212, the search result of the cyber attack event information having a predetermined similarity relationship with the cyber attack event information 4 is displayed. As an example, a list of cyber attack activities such as "BBB campaign" and "CCC campaign" having a similarity relationship with the cyber attack activity of the cyber attack event information 4 is displayed. From the related event display region 212, a user may confirm the list of the cyber attack event information having the predetermined similarity relationship with the cyber attack event information 4.

In addition, in the related event display region 212, information indicating a degree of similarity such as "Count" indicating the number of child elements matching with each other in contents, for example, the number of similar matters is displayed. From the "Count," a user may easily confirm the number of similar matters between the registered cyber attack event information 4 and the cyber attack event information similar to the cyber attack event information 4.

In addition, in the cyber attack event display region 211, the cyber attack event information displayed together with the registered cyber attack event information 4 may be selected from the list in the related event display region 212 by the operation of the console 201 in the related event display region 212.

For example, based on the operation information from the client terminal 2, the display information generator 35 specifies a cyber attack activity selected by the console 201 from the list in the related event display region 212. Subsequently, the display information generator 35 reads information of the specified cyber attack activity from the cyber attack event information DB 5, and generates display information of a graphic diagram to be displayed in the cyber attack event display region 211. As described above, in the cyber attack event display region 211, the cyber attack event information displayed together with the registered cyber attack event information 4 may be selected automatically or by the operation instruction of the client terminal 2.

The detailed information display region 213 is a region for displaying, for example, details of a node selected by the console 201 from the nodes 220, 220a, 220b, 230, 230a, and 230b on the cyber attack event display region 211.

For example, based on the operation information from the client terminal 2, the display information generator 35 specifies a node selected by the console 201 from the nodes on the cyber attack event display region 211. Subsequently, the display information generator 35 reads detailed information of the specified node from the cyber attack event information DB 5, and generates display information for displaying the read detailed information on the detailed information display region 213.

Figure 7:
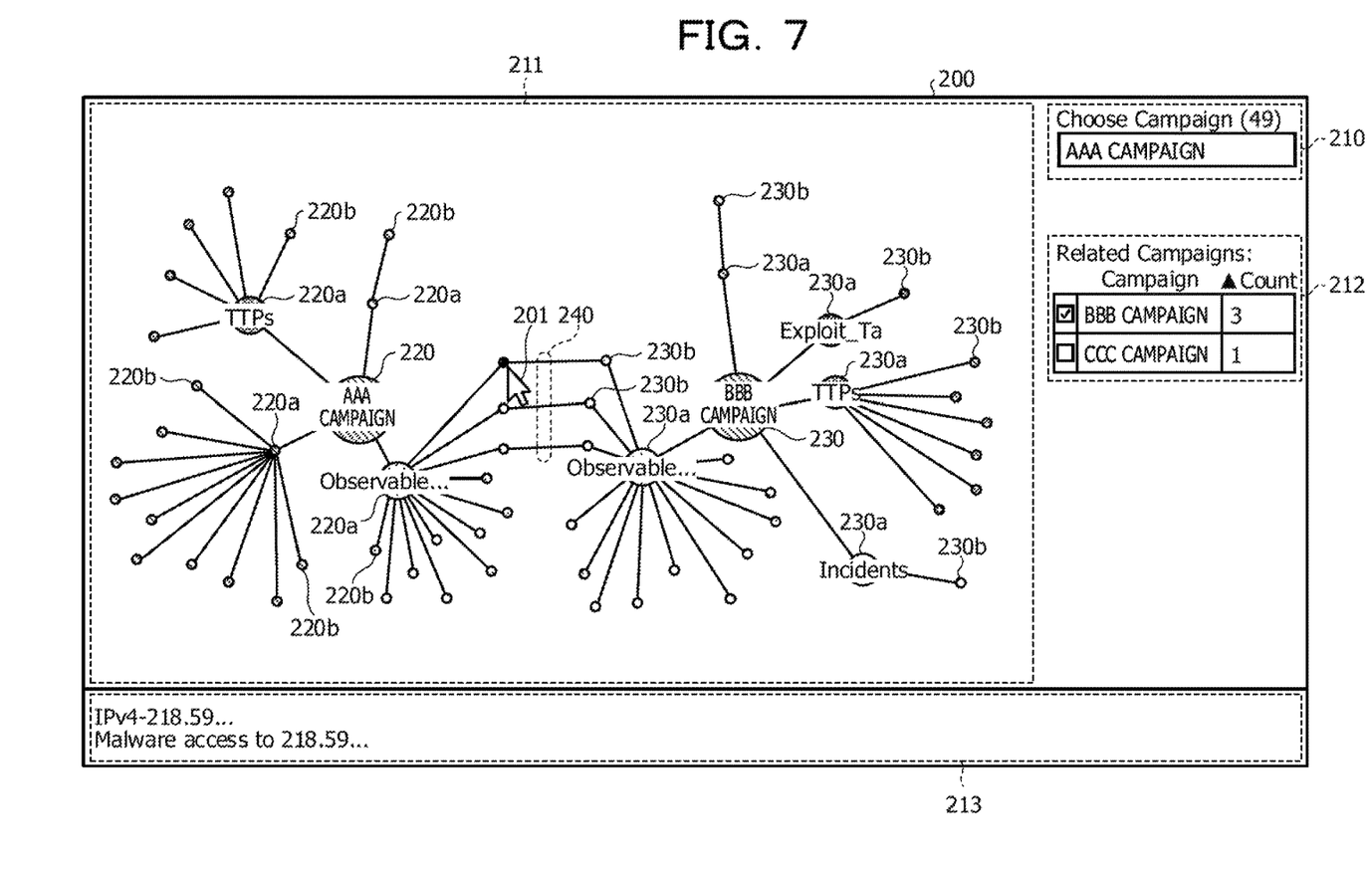
FIG. 7 is an explanatory view for explaining detailed display of nodes.

FIG. 7 is an explanatory view for explaining the display of details of a node. As illustrated in FIG. 7, when a node 220b is selected by the console 201, detailed information of the selected node 220b is displayed in the detailed information display region 213. Accordingly, a user may confirm the details of the node 220b.

As described above, when the cyber attack event information 4 including information of malware is registered as a result of a detection of the malware in the information processing system to be monitored, the server device 3 searches cyber attack event information having a predetermined similarity relationship with the registered cyber attack event information 4 by referring to the cyber attack event information DB 5 for past cyber attack events. Subsequently, the server device 3 generates display information for displaying both the searched cyber attack event information and the registered cyber attack event information 4 on the display unit 2a according to the operation instruction of the client terminal 2, and outputs the display information to the client terminal 2.

Based on the display information, the client terminal 2 displays both the registered cyber attack event information 4 and the cyber attack event information searched as having a predetermined similarity relationship with the cyber attack event information 4 on the display unit 2a. For example, the client terminal 2 may present information of similar cyber attacks with each other in an easy-to-understand manner to a user.

In addition, the display information generated by the server device 3 includes the number of similar matters between the cyber attack event of the registered cyber attack event information 4 and the cyber attack event of the searched cyber attack event information. Accordingly, the client terminal 2 displays the number of similar matters with each other between the registered cyber attack event information 4 and the searched cyber attack event information on the display unit 2a. Thus, a user may easily confirm the number of similar matters.

In addition, each component of the respective illustrated units is not necessarily required to be configured physically as illustrated therein. For example, concrete forms of distribution or integration of the individual units are not limited to those illustrated, and all or some of the units may be configured to be functionally or physically distributed or integrated in arbitrary units depending on, for example, various loads or use conditions.

In addition, all or some of the various process functions performed in the server device 3 may be implemented on a central processing unit (CPU) (or a microcomputer such as a micro processing unit (MPU) or a micro controller unit (MCU)). In addition, some or all of the various process functions may be implemented on a program analyzed and executed in a CPU (or a microcomputer such as a MPU or a MCU) or on hardware by a wired logic. In addition, the various process functions executed in the server device 3 may be executed by the cooperation of a plurality of computers through cloud computing.

Further, in the embodiment, the analysis support system 1 of a client/server (C/S) model including the client terminal 2 and the server device 3 has been described as an example. However, the analysis support system 1 may be configured by the single body of the client terminal 2 such that the various process functions of the server device 3 are executed by the side of the client terminal 2. The server device 3 may acquire the cyber attack event information 4 from a separate device without using the client terminal 2.

Figure 8:
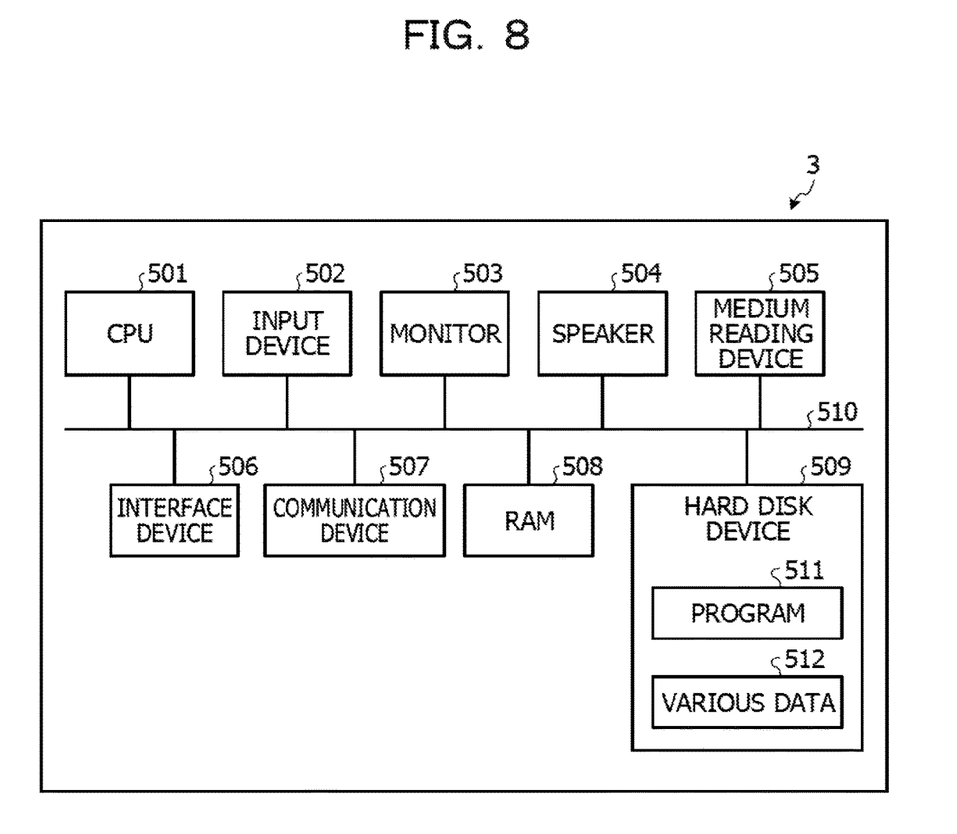
FIG. 8 is a block diagram illustrating an exemplary hardware configuration of the server device according to the embodiment.

However, the various processes that have been described in the above-described embodiment may be implemented by executing previously prepared programs with a computer. Thus, hereinafter, an example of a computer (hardware) executing programs having similar functions to those in the above-described embodiment will be described. FIG. 8 is a block diagram illustrating an exemplary hardware configuration of the server device 3 according to the embodiment.

As illustrated in FIG. 8, the server device 3 includes a CPU 501 that executes various arithmetic processes, an input device 502 that receives an input of data, a monitor 503, and a speaker 504. Further, the server device 3 includes a medium reading device 505 that reads programs and other from a storage medium, an interface device 506 for a connection to various devices, and a communication device 507 for a wired or wireless communication connection to an external device. Further, the server device 3 includes a RAM 508 that temporarily stores various types of information and a hard disk device 509. In addition, the respective units 501 to 509 within the server device 3 are coupled to a bus 510.

The hard disk device 509 stores programs 511 for executing various processes in the input unit 31, the registration unit 32, the search unit 34, the display information generator 35, and the output unit 36 as described in the embodiment above. In addition, the hard disk device 509 stores various data 512 (e.g., the cyber attack event information DB 5) referred to by the programs 511. The input device 502 receives, for example, an input of operation information from an operator. The monitor 503 displays, for example, various screens operated by an operator. For example, a printing device or the like is coupled to the interface device 506. The communication device 507 is coupled to a communication network such as a local area network (LAN), and exchanges various types of information with an external device via the communication network.

The CPU 501 executes various processes by reading the programs 511 stored in the hard disk device 509 and developing and executing the programs in the RAM 508. In addition, the programs 511 may not be stored in the hard disk device 509. For example, the server device 3 may read and execute the programs 511 stored in a storage medium that may be read by the server device 3. The storage medium that may be read by the server device 3 corresponds to, for example, a compact disc read only memory (CD-ROM), a digital versatile disk (DVD), a portable recording medium such as a universal serial bus (USB), a semiconductor memory such as a flash memory, a hard disk drive or the like. In addition, the programs 511 may be stored in a device connected to a public line, the Internet, or the LAN, and the server device 3 may read the programs 511 from the device to execute the programs 511.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiment(s) of the present disclosure has (have) been described in detail, it should be understood that the various changes, substitutions, and alterations could be made hereto without departing from the spirit and scope of the disclosure.

What is claimed is:

1. A non-transitory computer readable recording medium storing a computer executable program that causes a computer to perform a cyber attack analysis support process, the cyber attack analysis support process comprising:
   when information of a first cyber attack event including items related to malware is registered as a result of a detection of the malware within an information processing system to be monitored, comparing the items of the information of the first cyber attack event with items of information on past cyber attack events stored in a storage, respectively;
   selecting a second cyber attack event in which a number of same items of the information as the first cyber attack event is equal to or greater than a predetermined number among the past cyber attack events; and
   displaying information of the second cyber attack event selected at the selecting and the registered information of the first cyber attack event on a display,
   wherein the display displays a connection status of each item of the information of the first cyber attack event to each item of the information of the second cyber attack event to be either connected or non-connected, and
   causing, in a case where the same items between the first cyber attack event and the second cyber attack event are detected, the display to further display the same items in a display form in which coupling lines connect nodes corresponding to the same items in the display of the first cyber attack event and nodes corresponding to the same items in the display of the second cyber attack event to each other, respectively.

2. The non-transitory computer readable recording medium according to claim 1, the cyber attack analysis support process further comprising:

displaying a result of the comparison including displaying information indicating a number of the same items between the first cyber attack event and the second cyber attack event.

3. The non-transitory computer readable recording medium according to claim 1, wherein the cyber attack analysis support process further comprising:
causing the display to display the same items in a display form in which the same items are associated when the first cyber attack event and the second cyber attack event are displayed.

4. The non-transitory computer readable recording medium according to claim 3, wherein the same items are at least one of an IP address or a mail address and an account of a social network service of an unauthorized access source.

5. The non-transitory computer readable recording medium according to claim 3, wherein a display of the first cyber attack event is a display of at least one of information on a pattern of a first cyber attack regarding the first cyber attack event, information on an attack base of an attacker, and information on a target to be attacked.

6. A cyber attack analysis support method comprising:
comparing, by a computer, when information of a first cyber attack event including items related to malware is registered as a result of a detection of the malware within an information processing system to be monitored, the items of the information of the first cyber attack event with items of information on past cyber attack events stored in a storage, respectively;
selecting a second cyber attack event in which a number of same items of the information as the first cyber attack event is equal to or greater than a predetermined number among the past cyber attack events; and
displaying information of the second cyber attack event selected at the selecting and the registered information of the first cyber attack event on a display,
wherein the display displays a connection status of each item of the information of the first cyber attack event to each item of the information of the second cyber attack event to be either connected or non-connected, and
causing, in a case where the same items between the first cyber attack event and the second cyber attack event are detected, the display to further display the same items in a display form in which coupling lines connect nodes corresponding to the same items in the display of the first cyber attack event and nodes corresponding to the same items in the display of the second cyber attack event to each other, respectively.

7. The cyber attack analysis support method according to claim 6, further comprising:
displaying a result of the comparison including displaying information indicating a number of the same items between the first cyber attack event and the second cyber attack event.

8. The cyber attack analysis support method according to claim 6, further comprising:
causing the display to display the same items in a display form in which the same items are associated when the first cyber attack event and the second cyber attack event are displayed.

9. The cyber attack analysis support method according to claim 8, wherein the same items are at least one of an IP address or a mail address and an account of a social network service of an unauthorized access source.

10. The cyber attack analysis support method according to claim 8, wherein a display of the first cyber attack event is a display of at least one of information on a pattern of a first cyber attack regarding the first cyber attack event, information on an attack base of an attacker, and information on a target to be attacked.

11. A cyber attack analysis support device comprising:
a memory that stores a computer executable program; and
a processor that executes a process based on the computer executable program, wherein the process includes:
comparing, when information of a first cyber attack event including items related to malware is registered as a result of a detection of the malware within an information processing system to be monitored, the items of the information of the first cyber attack event with items of information on past cyber attack events stored in a storage, respectively;
selecting a second cyber attack event in which a number of same items of the information as the first cyber attack event is equal to or greater than a predetermined number among the past cyber attack events; and
displaying information of the second cyber attack event selected at the selecting and the registered information of the first cyber attack event on a display,
wherein the display displays a connection status of each item of the information of the first cyber attack event to each item of the information of the second cyber attack event to be either connected or non-connected, and
causing, in a case where the same items between the first cyber attack event and the second cyber attack event are detected, the display to further display the same items in a display form in which coupling lines connect nodes corresponding to the same items in the display of the first cyber attack event and nodes corresponding to the same items in the display of the second cyber attack event to each other, respectively.

12. The cyber attack analysis support device according to claim 11, the process further comprising:
displaying a result of the comparison including displaying information indicating a number of the same items between the first cyber attack event and the second cyber attack event.

13. The cyber attack analysis support device according to claim 11, wherein the process further comprising:
causing the display to display the same items in a display form in which the same items are associated when the first cyber attack event and the second cyber attack event are displayed.

14. The cyber attack analysis support device according to claim 13, wherein the same items are at least one of an IP address or a mail address and an account of a social network service of an unauthorized access source.

15. The cyber attack analysis support device according to claim 13, wherein a display of the first cyber attack event is a display of at least one of information on a pattern of a first cyber attack regarding the first cyber attack event, information on an attack base of an attacker, and information on a target to be attacked.

* * * * *